(12) United States Patent
Hu et al.

(10) Patent No.: US 8,433,852 B2
(45) Date of Patent: Apr. 30, 2013

(54) METHOD AND APPARATUS FOR FUZZY STRIDE PREFETCH

(75) Inventors: Shiliang Hu, Los Altos, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 12/871,164

(22) Filed: Aug. 30, 2010

(65) Prior Publication Data

US 2012/0054449 A1 Mar. 1, 2012

(51) Int. Cl.
*G06F 12/00* (2006.01)

(52) U.S. Cl.
USPC .............................. 711/137; 711/205

(58) Field of Classification Search .................. 711/137, 711/205
See application file for complete search history.

(56) References Cited

U.S. PATENT DOCUMENTS

| | | | |
|---|---|---|---|
| 6,134,643 A | 10/2000 | Kedem et al. | |
| 6,401,192 B1 * | 6/2002 | Schroter et al. | 712/207 |
| 6,915,415 B2 * | 7/2005 | Mayfield et al. | 712/225 |
| 6,976,147 B1 * | 12/2005 | Isaac et al. | 711/205 |
| 8,166,251 B2 * | 4/2012 | Luttrell | 711/137 |
| 2009/0198910 A1 * | 8/2009 | Arimilli et al. | 711/141 |

FOREIGN PATENT DOCUMENTS

| | | |
|---|---|---|
| JP | 11-167520 A | 6/1999 |
| KR | 10-2010-0005539 A | 1/2010 |
| WO | 2012/030466 A2 | 3/2012 |
| WO | 2012/030466 A3 | 6/2012 |

OTHER PUBLICATIONS

International Search Report and Written Opinion for PCT Patent Application No. PCT/US2011/046434, mailed on Apr. 6, 2012, 8 pages.

* cited by examiner

*Primary Examiner* — Hashem Farrokh
(74) *Attorney, Agent, or Firm* — David L. Guglielmi

(57) ABSTRACT

In one embodiment, the present invention includes a prefetching engine to detect when data access strides in a memory fall into a range, to compute a predicted next stride, to selectively prefetch a cache line using the predicted next stride, and to dynamically control prefetching. Other embodiments are also described and claimed.

6 Claims, 4 Drawing Sheets

METHOD AND APPARATUS FOR FUZZY STRIDE PREFETCH

BACKGROUND

In modern processors, prefetching from memory allows data and instructions that may be needed in the future to be loaded in cache. In this way it may be possible to avoid the additional overhead associated with a later transfer if there otherwise would have been a cache miss if not for the prefetching. However, prefetching cache lines that are not needed tends to waste memory bandwidth and pollute caches.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
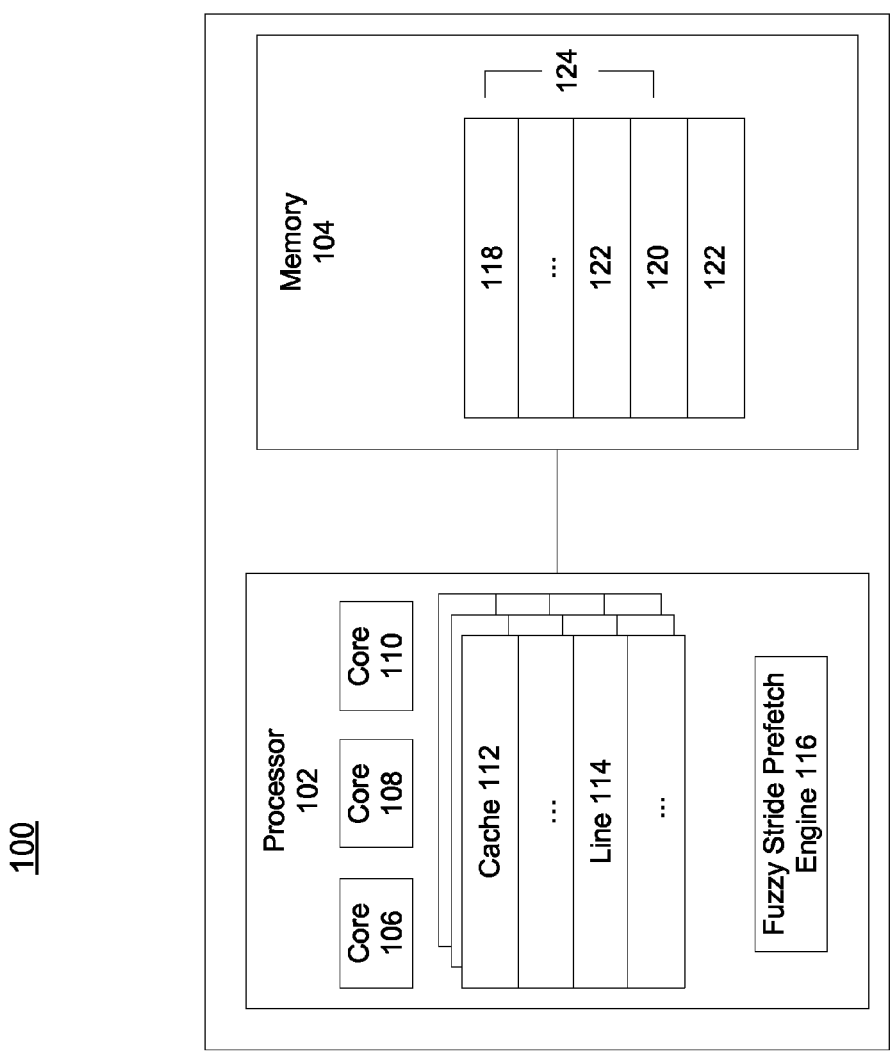
FIG. 1 is a block diagram of an example apparatus for fuzzy stride prefetch in accordance with one embodiment of the present invention.

Referring now to FIG. 1, shown is a block diagram of an example apparatus for fuzzy stride prefetch in accordance with one embodiment of the present invention. As shown in FIG. 1, apparatus 100 may include processor 102 and memory 104, such as dynamic random access memory (DRAM). Processor 102 may include cores 106-110, cache 112 and fuzzy stride prefetch engine 116. Cores 106-110 may be able to execute instructions independently from one another and may include any type of architecture. While shown as including three cores, processor 102 may have any number of cores and may include other components or controllers, not shown. In one embodiment, processor 102 is a system on a chip (SOC).

Cache 112 may include any number of separate caches and may contain any number of entries. While intended as a low latency level one cache, cache 112 may be implemented in any memory technology at any hierarchical level. In one embodiment, cache 112 stores a number of cache lines, for example line 114, either fetched or prefetched from regions of memory 104, for example region 118. However, the present invention may be practiced by prefetching between various other levels of cache or memory.

Figure 2:
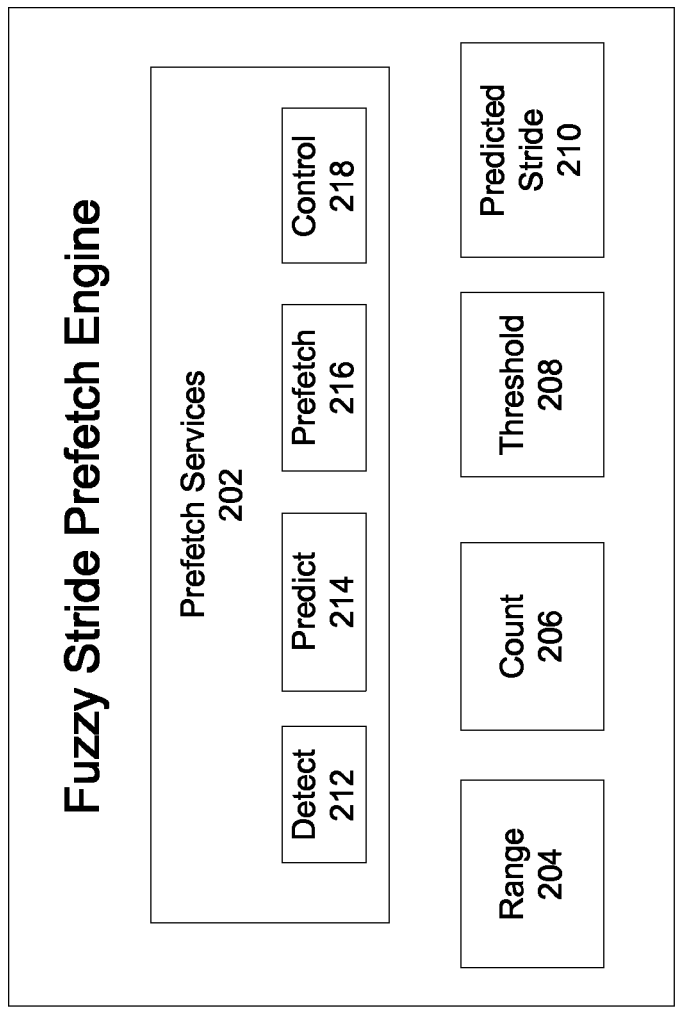
FIG. 2 is a block diagram of an example fuzzy stride prefetch engine in accordance with an embodiment of the present invention.
Figure 4:
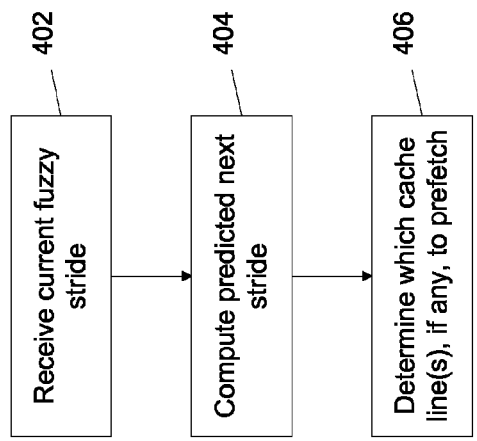
FIG. 4 is a flow chart for predicting a stride in accordance with an embodiment of the present invention.
Figure 3:
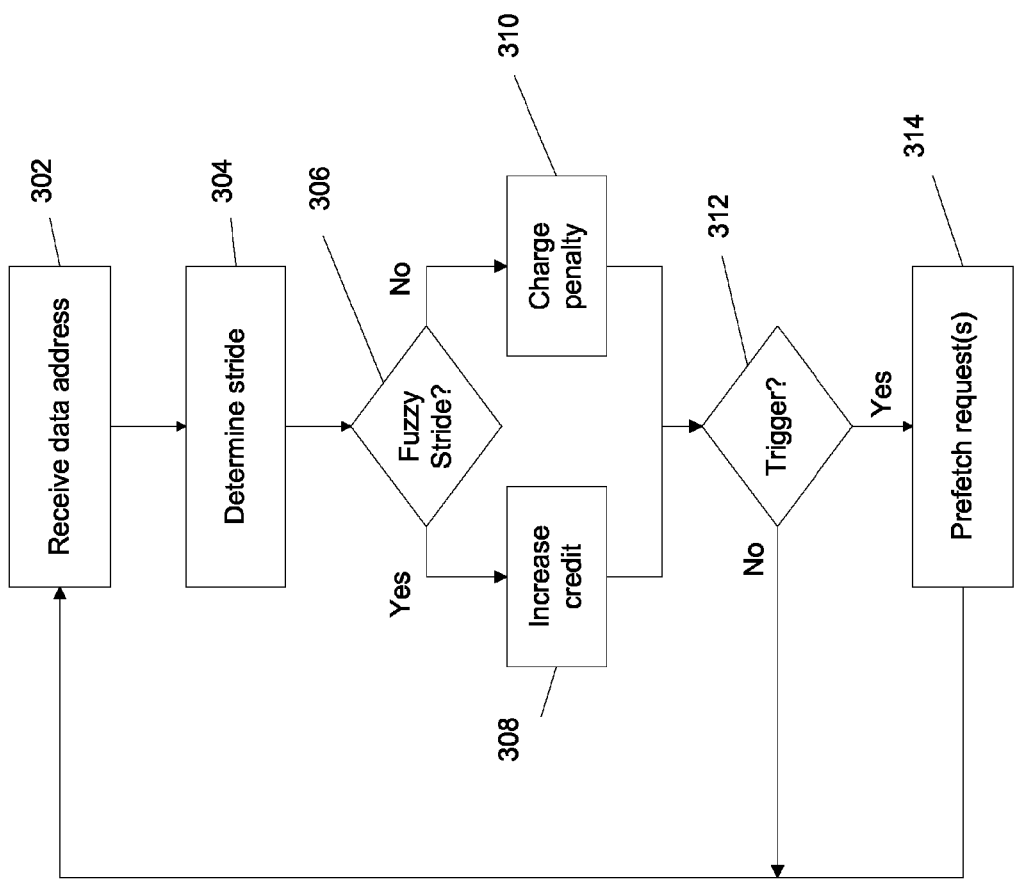
FIG. 3 is a flow chart for detecting and responding to fuzzy strides in accordance with an embodiment of the present invention.

Fuzzy stride prefetch engine 116 may implement a method for fuzzy stride prefetch, for example as described in reference to FIGS. 3 and 4, and may have an architecture as described in reference to FIG. 2. Fuzzy stride prefetch engine 116 may be separate from processor 102 and may be implemented in hardware, software or a combination of hardware and software.

As used herein, stride 124 refers to a distance between memory addresses. In some embodiments, stride 124 refers to a current stride or distance between the addresses of consecutive memory reads requested by processor 102. In other embodiments, stride 124 refers to a predicted stride or guess as to what memory address will next be requested and may be advantageous to prefetch, as described in more detail hereinafter.

Referring now to FIG. 2, shown is a block diagram of an example fuzzy stride prefetch engine in accordance with an embodiment of the present invention. As shown in FIG. 2, fuzzy stride prefetch engine 116 may include prefetch services 202, range 204, count 206, threshold 208 and predicted stride 210. Prefetch services 202 may include detect services 212, predict services 214, prefetch services 216, and control services 218 which may detect when data access strides in a memory fall into a range, compute a predicted next stride, selectively prefetch one or more cache lines using the predicted next stride, and provide adaptive control by an external module, respectively.

Detect services 212 may detect when data access strides in a memory (for example stride 124 in memory 104) fall into range 204. As used herein, fuzzy stride refers to a stream of non-constant address strides 124 (for example, a stream of memory reads by processor 102) that fall mostly into a narrow range 204 (for example, range 204 may be 128 bytes to 192 bytes, i.e. two or three cache lines away from the previous data access). While some applications may have data access patterns that would benefit from fuzzy stride prefetching, others applications may not, and the present invention may be practiced in conjunction with other prefetching techniques. In one embodiment, detect services 212 uses a credit-based system to track whether a series of address strides 124 fall with range 204. In one embodiment, detect services 212 increases count 206 when a data access stride 124 falls into range 204 and decreases count 206 when a data access stride 124 falls outside range 204.

Predict services 214 may compute a predicted stride 210. In one embodiment, predict services 214 averages the fuzzy strides of recent previous accesses (for example PredictedStride=SumofPrevious5Strides/5). In another embodiment, predict services 214 may weight the current fuzzy stride more heavily in computing predicted stride 210 (for example PredictedStride=(PredictedStride+CurrentStride)/2). Other methods for computing predicted stride 210 would occur to those skilled in the art and are considered to be within the scope of the present invention.

Prefetch services 216 may selectively prefetch one or more cache lines using predicted stride 210. In one embodiment, prefetch services 216 will only prefetch a cache line identified by predicted stride 210 (for example, by adding predicted stride 210 to the prior memory address accessed) if count 206 meets or exceeds threshold 208, thereby indicating a greater likelihood that a fuzzy stride prefetch would be beneficial. In one embodiment, prefetch services 214 may also prefetch adjacent memory region 122 in a second cache line if the memory address indicated by predicted stride 210 is sufficiently close to a boundary of memory region 120.

Control services 218 may provide adaptive control by an external module, such as other software or hardware or combinations of hardware and software. In one embodiment, control services 218 initializes range 204, count 206 and threshold 208 upon an activation with values stored in a memory. In one embodiment, the range, the threshold, whether to prefetch a cache line, and whether to prefetch a second cache line may be controlled by an external optimization module (not shown) that monitors the effectiveness of fuzzy stride prefetching. In another embodiment, control services 218 may allow a software application that is self-aware as to its data access patterns to initialize, update, and/or modify variables such as range 204 and threshold 208, for example to encourage or discourage fuzzy stride prefetching as appropriate to improve performance.

Referring now to FIG. 3, shown is a flow chart for detecting and responding to fuzzy strides in accordance with an embodiment of the present invention. As shown in FIG. 3, the method begins with detect services 212 receiving (302) a data access address. In one embodiment, detect services 212 is invoked on every memory read. In another embodiment, detect services 212 is invoked on every cache miss. Next, detect services 212 determines (304) the stride 124 of the data access by taking the difference from the previous data access.

Detect services 212 will then compare stride 124 with range 204 to determine (306) if stride 124 would be considered a fuzzy stride. If so, count 206 is increased (308). If not, count 206 is decreased (310).

Prefetch services 216 would then compare count 206 with threshold 210 to determine (312) whether to trigger a prefetch. If count 206 has met threshold 210, then prefetch services 216 would prefetch (314) one or more cache lines based on predicted stride 210.

Referring now to FIG. 4, shown is a flow chart for predicting a stride in accordance with an embodiment of the present invention. As shown in FIG. 4, the method begins with predict services 214 receiving (402) a current fuzzy stride value from detect services 212. Next, predict services 214 will compute (404) an updated predicted stride 210. When a prefetch has been triggered, prefetch services 216 will use predicted stride 210 to determine (406) which cache line or lines to prefetch.

Figure 5:
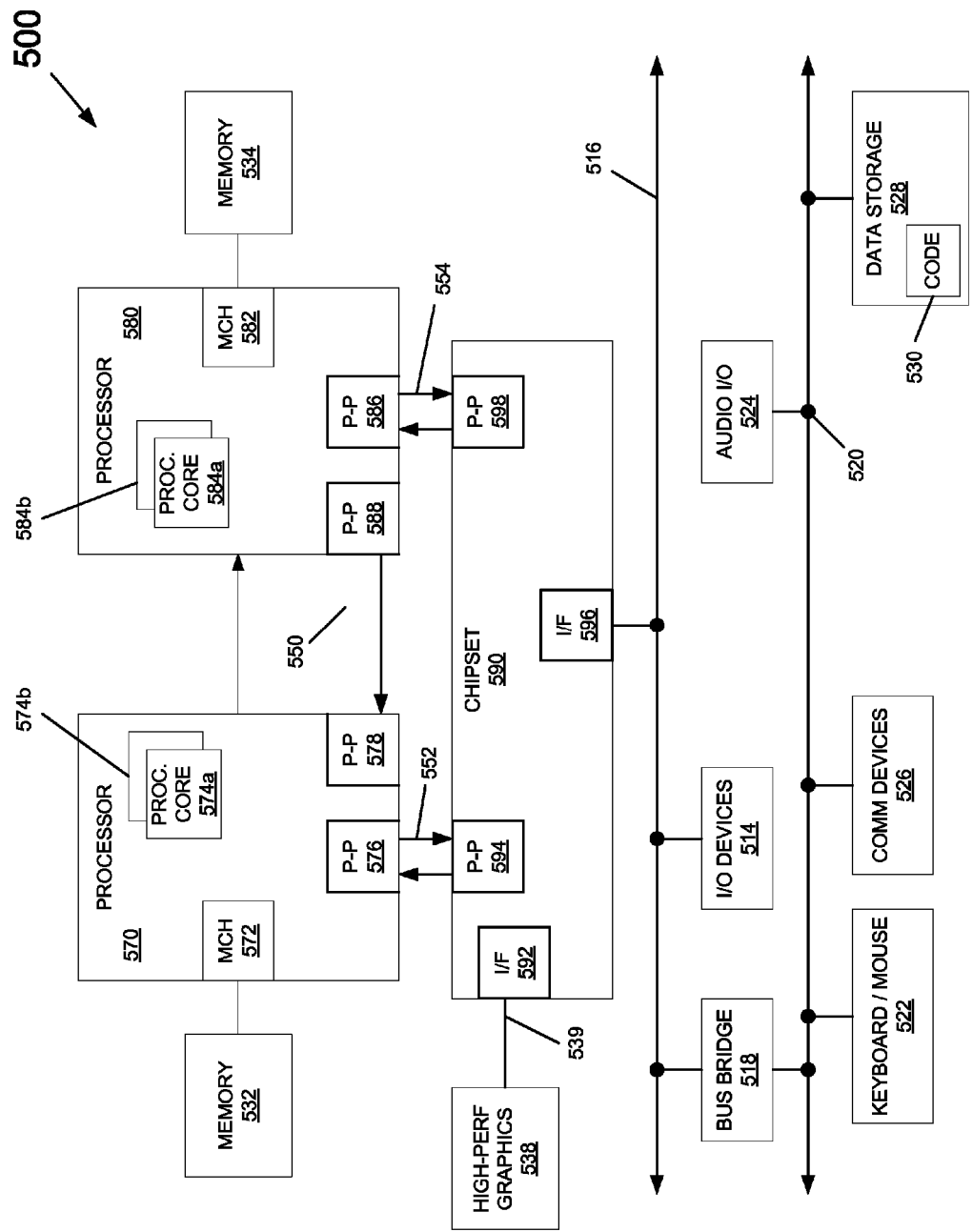
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each processor may include fuzzy stride prefetch hardware, software, and firmware in accordance with an embodiment of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors, each of which may include extended page tables in accordance with one embodiment of the present invention. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, solid state drives (SSDs), electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A storage medium comprising content which, when executed by an accessing machine, causes the accessing machine to:
   detect when data access strides in a memory fall into a range;
   to maintain a credit-based system to track data access strides that fall into the range, wherein the credit-based system comprises increasing a count when a data access falls into the range and decreasing the count when a data access strides falls outside the range;
   compute a predicted next stride based at least in part on an average stride of recent previous accesses; and
   selectively prefetch a cache line using the predicted next stride, wherein the content to selectively prefetch a cache line comprises content to prefetch a cache line when the count reaches a threshold.

2. The storage medium of claim 1, further comprising content which, when executed by an accessing machine, causes the accessing machine to prefetch a second adjacent cache line.

3. The storage medium of claim 1, further comprising content which, when executed by an accessing machine, causes the accessing machine to change one or more variables chosen from the group consisting of: the range, the threshold, whether to prefetch a cache line, and whether to prefetch a second cache line.

4. The storage medium of claim 3, further comprising content which, when executed by an accessing machine, causes the accessing machine to provide adaptive external control.

5. A system comprising:
- a processor including a first core to execute instructions and a cache to store a plurality of entries;
- a dynamic random access memory (DRAM) coupled to the processor; and
- a fuzzy stride prefetch handler to detect when data access strides in a memory fall into a range, to maintain a credit-based system to track data access strides that fall into the range, wherein the credit-based system comprises increasing a count when a data access falls into the range and decreasing the count when a data access strides falls outside the range, to compute a predicted next stride based at least in part on an average stride of recent previous accesses, and to selectively prefetch a cache line using the predicted next stride, wherein the fuzzy stride prefetch handler to selectively prefetch a cache line comprises the fuzzy stride prefetch handler to prefetch a cache line when the count reaches a threshold.

6. The system of claim 5, further comprising the fuzzy stride prefetch handler to prefetch a second adjacent cache line.

* * * * *